United States Patent
Ito et al.

(10) Patent No.: US 6,728,470 B2
(45) Date of Patent: Apr. 27, 2004

(54) DATA RECORDING AND REPRODUCING APPARATUS AND METHOD

(75) Inventors: Norikazu Ito, Kanagawa (JP); Hiroyuki Fujita, Kanagawa (JP); Satoshi Yoneya, Kanagawa (JP); Masakazu Yoshimoto, Kanagawa (JP); Satoshi Katsuo, Kanagawa (JP); Jun Yoshikawa, Kanagawa (JP); Satoshi Yutani, Kanagawa (JP); Koichi Sato, Tokyo (JP); Tomohisa Shiga, Kanagawa (JP); Masaki Hirose, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/301,952

(22) Filed: Apr. 29, 1999

(65) Prior Publication Data

US 2003/0128967 A1 Jul. 10, 2003

(30) Foreign Application Priority Data

May 1, 1998 (JP) .......................... 10-122535

(51) Int. Cl.$^7$ ................................ H04N 5/91
(52) U.S. Cl. ................ 386/68; 386/46; 386/71; 386/125; 360/27; 348/552
(58) Field of Search .................... 386/46, 125–126, 386/70, 82, 68, 71; 360/27, 47; 348/474, 552; H04N 5/91

(56) References Cited

U.S. PATENT DOCUMENTS

| | | | | | |
|---|---|---|---|---|---|
| 5,428,393 A | * | 6/1995 | Enokida | .................. | 348/390.1 |
| 5,479,303 A | * | 12/1995 | Suzuki et al. | .............. | 360/72.2 |
| 5,528,282 A | * | 6/1996 | Voeten et al. | ................. | 725/92 |
| 5,606,359 A | * | 2/1997 | Youden et al. | ................ | 725/88 |
| 5,610,841 A | * | 3/1997 | Tanaka et al. | .............. | 725/115 |
| 5,720,037 A | * | 2/1998 | Biliris et al. | .................. | 725/92 |

* cited by examiner

Primary Examiner—Vincent Boccio
Assistant Examiner—James A Fletcher
(74) Attorney, Agent, or Firm—Frommer Lawrence & Haug LLP; William S. Frommer; Gordon Kessler

(57) ABSTRACT

A data recording and reproducing apparatus capable of easily obtaining information which has few dropout and is necessary for variable speed reproduction at the time of variable speed reproduction. An image group dividing unit divides input image data into a plurality of image groups on a unit image basis, thereby forming plural divided data. After the formed divided data is temporarily stored into an image data temporary storing unit, the divided data is outputted as image data which is a data stream of the divided data in a predetermined image unit to a disk array apparatus via an HDD output interface unit. Each disk array apparatus records the divided data into HDDs so as to periodically change the relation between the HDDs and the groups of data to be recorded to the HDDs in a predetermined pattern.

10 Claims, 17 Drawing Sheets

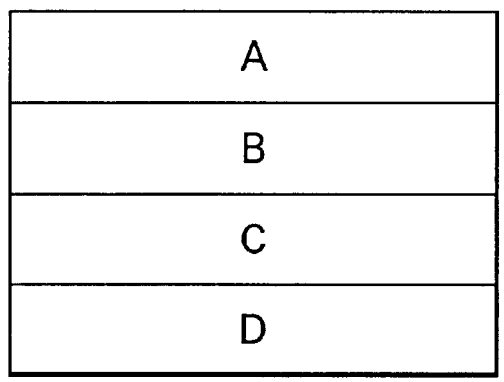
FIG.6
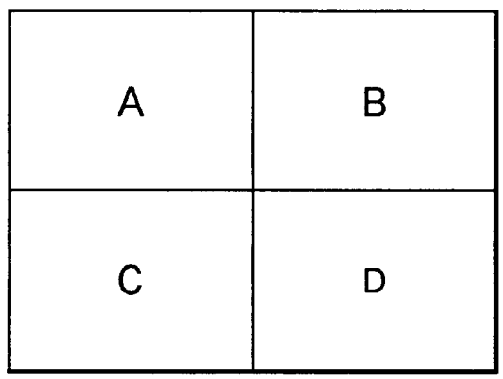
FIG.7
| A | B | C | D | A |
|---|---|---|---|---|
| B | C | D | A | B |
| C | D | A | B | C |
| D | A | B | C | D |
FIG.8

| Frame No. | HDD Gp W | HDD Gp X | HDD Gp Y | HDD Gp Z |
|---|---|---|---|---|
| 1 | A | B | C | D |
| 2 | B | C | D | A |
| 3 | C | D | A | B |
| 4 | D | A | B | C |
| 5 | A | B | C | D |
| 6 | B | C | D | A |
| 7 | C | D | A | B |
| 8 | D | A | B | C |
| 9 | A | B | C | D |
| 10 | B | C | D | A |
| 11 | C | D | A | B |
| 12 | D | A | B | C |
| 13 | A | B | C | D |
| 14 | B | C | D | A |
| 15 | C | D | A | B |
| 16 | D | A | B | C |
| 17 | A | B | C | D |
| 18 | B | C | D | A |
| 19 | C | D | A | B |
| 20 | D | A | B | C |
| 21 | A | B | C | D |
| 22 | B | C | D | A |
| 23 | C | D | A | B |
| 24 | D | A | B | C |
| 25 | A | B | C | D |
| 26 | B | C | D | A |
| 27 | C | D | A | B |
| 28 | D | A | B | C |
| 29 | A | B | C | D |
| 30 | B | C | D | A |
| 31 | C | D | A | B |
| 32 | D | A | B | C |

| 1A | 1B | 1C | 1D |

F1 : construction of first frame

| 2B | 2C | 2D | 2A |

F2 : construction of second frame

~D1 data accessed in a single operation

FIG.10

| Frame No. | HDD Gp W | HDD Gp X | HDD Gp Y | HDD Gp Z |
|---|---|---|---|---|
| 1 | A | B | C | D |
| 2 | B | C | D | A |
| 3 | C | D | A | B |
| 4 | D | A | B | C |
| 5 | A | B | C | D |
| 6 | B | C | D | A |
| 7 | C | D | A | B |
| 8 | D | A | B | C |
| 9 | A | B | C | D |
| 10 | B | C | D | A |
| 11 | C | D | A | B |
| 12 | D | A | B | C |
| 13 | A | B | C | D |
| 14 | B | C | D | A |
| 15 | C | D | A | B |
| 16 | D | A | B | C |
| 17 | A | B | C | D |
| 18 | B | C | D | A |
| 19 | C | D | A | B |
| 20 | D | A | B | C |
| 21 | A | B | C | D |
| 22 | B | C | D | A |
| 23 | C | D | A | B |
| 24 | D | A | B | C |
| 25 | A | B | C | D |
| 26 | B | C | D | A |
| 27 | C | D | A | B |
| 28 | D | A | B | C |
| 29 | A | B | C | D |
| 30 | B | C | D | A |
| 31 | C | D | A | B |
| 32 | D | A | B | C |

| 1A | 2B | 1C | 2D |
|---|---|---|---|

F1 : construction of first frame

| 3C | 4D | 3A | 4B |
|---|---|---|---|

F2 : construction of second frame

| 17B | 18C | 17D | 18A |
|---|---|---|---|

F9 : construction of ninth frame

FIG.11

| Frame No. | HDD Gp W | HDD Gp X | HDD Gp Y | HDD Gp Z |
|---|---|---|---|---|
| 1 | A | B | C | D |
| 2 | B | C | D | A |
| 3 | C | D | A | B |
| 4 | D | A | B | C |
| 5 | A | B | C | D |
| 6 | B | C | D | A |
| 7 | C | D | A | B |
| 8 | D | A | B | C |
| 9 | A | B | C | D |
| 10 | B | C | D | A |
| 11 | C | D | A | B |
| 12 | D | A | B | C |
| 13 | A | B | C | D |
| 14 | B | C | D | A |
| 15 | C | D | A | B |
| 16 | D | A | B | C |
| 17 | A | B | C | D |
| 18 | B | C | D | A |
| 19 | C | D | A | B |
| 20 | D | A | B | C |
| 21 | A | B | C | D |
| 22 | B | C | D | A |
| 23 | C | D | A | B |
| 24 | D | A | B | C |
| 25 | A | B | C | D |
| 26 | B | C | D | A |
| 27 | C | D | A | B |
| 28 | D | A | B | C |
| 29 | A | B | C | D |
| 30 | B | C | D | A |
| 31 | C | D | A | B |
| 32 | D | A | B | C |

| 1A | 2B | 3C | 4D |
|---|---|---|---|

F1 : construction of first frame

| 5A | 6B | 7C | 8D |
|---|---|---|---|

F2 : construction of second frame

FIG.12

| | | | | |
|---|---|---|---|---|
| 33 | A | B | C | D |
| 34 | B | C | D | A |
| 35 | C | D | A | B |
| 36 | D | A | B | C |
| 37 | A | B | C | D |
| 38 | B | C | D | A |
| 39 | C | D | A | B |
| 40 | D | A | B | C |
| 41 | A | B | C | D |
| 42 | B | C | D | A |
| 43 | C | D | A | B |
| 44 | D | A | B | C |
| 45 | A | B | C | D |
| 46 | B | C | D | A |
| 47 | C | D | A | B |
| 48 | D | A | B | C |
| 49 | A | B | C | D |
| 50 | B | C | D | A |
| 51 | C | D | A | B |
| 52 | D | A | B | C |
| 53 | A | B | C | D |
| 54 | B | C | D | A |
| 55 | C | D | A | B |
| 56 | D | A | B | C |
| 57 | A | B | C | D |
| 58 | B | C | D | A |
| 59 | C | D | A | B |
| 60 | D | A | B | C |
| 61 | A | B | C | D |
| 62 | B | C | D | A |
| 63 | C | D | A | B |
| 64 | D | A | B | C |

| 33C | 34D | 35A | 36B |
|---|---|---|---|

F9 : construction of ninth frame

FIG.13

| Frame No. | HDD Gp W | HDD Gp X | HDD Gp Y | HDD Gp Z |
|---|---|---|---|---|
| 1 | A | B | C | D |
| 2 | B | C | D | A |
| 3 | C | D | A | B |
| 4 | D | A | B | C |
| 5 | A | B | C | D |
| 6 | B | C | D | A |
| 7 | C | D | A | B |
| 8 | D | A | B | C |
| 9 | A | B | C | D |
| 10 | B | C | D | A |
| 11 | C | D | A | B |
| 12 | D | A | B | C |
| 13 | A | B | C | D |
| 14 | B | C | D | A |
| 15 | C | D | A | B |
| 16 | D | A | B | C |
| 17 | A | B | C | D |
| 18 | B | C | D | A |
| 19 | C | D | A | B |
| 20 | D | A | B | C |
| 21 | A | B | C | D |
| 22 | B | C | D | A |
| 23 | C | D | A | B |
| 24 | D | A | B | C |
| 25 | A | B | C | D |
| 26 | B | C | D | A |
| 27 | C | D | A | B |
| 28 | D | A | B | C |
| 29 | A | B | C | D |
| 30 | B | C | D | A |
| 31 | C | D | A | B |
| 32 | D | A | B | C |

| 1A | 2B | 3C | 4D |
|---|---|---|---|

F1 : construction of first frame

| 9A | 10B | 11C | 12D |
|---|---|---|---|

F2 : construction of second frame

FIG.14

| | | | | |
|---|---|---|---|---|
| 33 | A | B | C | D |
| 34 | B | C | D | A |
| 35 | C | D | A | B |
| 36 | D | A | B | C |
| 37 | A | B | C | D |
| 38 | B | C | D | A |
| 39 | C | D | A | B |
| 40 | D | A | B | C |
| 41 | A | B | C | D |
| 42 | B | C | D | A |
| 43 | C | D | A | B |
| 44 | D | A | B | C |
| 45 | A | B | C | D |
| 46 | B | C | D | A |
| 47 | C | D | A | B |
| 48 | D | A | B | C |
| 49 | A | B | C | D |
| 50 | B | C | D | A |
| 51 | C | D | A | B |
| 52 | D | A | B | C |
| 53 | A | B | C | D |
| 54 | B | C | D | A |
| 55 | C | D | A | B |
| 56 | D | A | B | C |
| 57 | A | B | C | D |
| 58 | B | C | D | A |
| 59 | C | D | A | B |
| 60 | D | A | B | C |
| 61 | A | B | C | D |
| 62 | B | C | D | A |
| 63 | C | D | A | B |
| 64 | D | A | B | C |

| 33B | 34C | 35D | 36A |
|---|---|---|---|

F5 : construction of fifth frame

FIG.15

| 65 | A | B | C | D |
|----|---|---|---|---|
| 66 | B | C | D | A |
| 67 | C | D | A | B |
| 68 | D | A | B | C |
| 69 | A | B | C | D |
| 70 | B | C | D | A |
| 71 | C | D | A | B |
| 72 | D | A | B | C |
| 73 | A | B | C | D |
| 74 | B | C | D | A |
| 75 | C | D | A | B |
| 76 | D | A | B | C |
| 77 | A | B | C | D |
| 78 | B | C | D | A |
| 79 | C | D | A | B |
| 80 | D | A | B | C |
| 81 | A | B | C | D |
| 82 | B | C | D | A |
| 83 | C | D | A | B |
| 84 | D | A | B | C |
| 85 | A | B | C | D |
| 86 | B | C | D | A |
| 87 | C | D | A | B |
| 88 | D | A | B | C |
| 89 | A | B | C | D |
| 90 | B | C | D | A |
| 91 | C | D | A | B |
| 92 | D | A | B | C |
| 93 | A | B | C | D |
| 94 | B | C | D | A |
| 95 | C | D | A | B |
| 96 | D | A | B | C |

FIG.16

| | | | | |
|---|---|---|---|---|
| 97 | A | B | C | D |
| 98 | B | C | D | A |
| 99 | C | D | A | B |
| 100 | D | A | B | C |
| 101 | A | B | C | D |
| 102 | B | C | D | A |
| 103 | C | D | A | B |
| 104 | D | A | B | C |
| 105 | A | B | C | D |
| 106 | B | C | D | A |
| 107 | C | D | A | B |
| 108 | D | A | B | C |
| 109 | A | B | C | D |
| 110 | B | C | D | A |
| 111 | C | D | A | B |
| 112 | D | A | B | C |
| 113 | A | B | C | D |
| 114 | B | C | D | A |
| 115 | C | D | A | B |
| 116 | D | A | B | C |
| 117 | A | B | C | D |
| 118 | B | C | D | A |
| 119 | C | D | A | B |
| 120 | D | A | B | C |
| 121 | A | B | C | D |
| 122 | B | C | D | A |
| 123 | C | D | A | B |
| 124 | D | A | B | C |
| 125 | A | B | C | D |
| 126 | B | C | D | A |
| 127 | C | D | A | B |
| 128 | D | A | B | C |

FIG.17

FIG.20
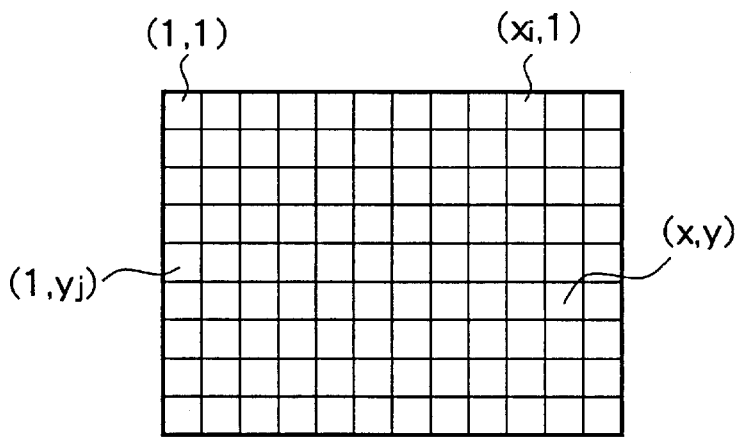
FIG.21
FIG.22
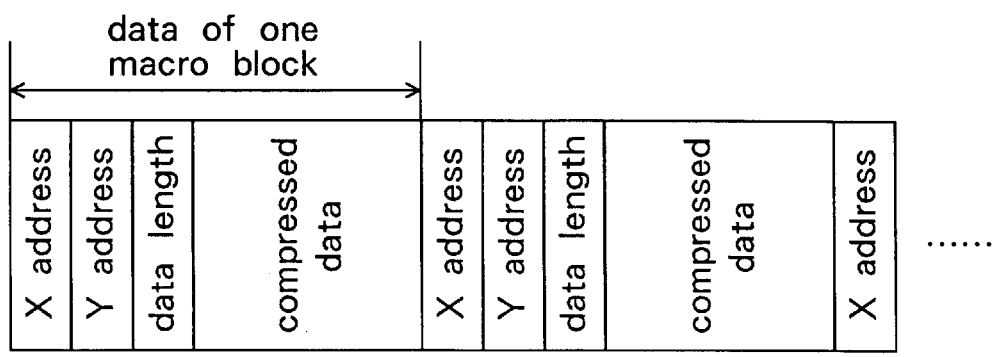
FIG.23

DATA RECORDING AND REPRODUCING APPARATUS AND METHOD

BACKGROUND OF THE INVENTION

1. Field of the Invention

The present invention relates to a data recording and reproducing apparatus and method for recording and reproducing video data and the like.

2. Description of the Related Art

In recent years, in association with the increase in the number of channels of providing information because of the widespread of CATVs (community antenna television or cable televisions) and the like, different from a VCR (Video Cassette Recorder) of a related art, the demand of simultaneously reproducing plural video and audio data from a single video and audio data recording and reproducing apparatus is increasing. In order to satisfy the demand, an apparatus called an audio video (hereinbelow, also referred to as "AV") server for recording and reproducing video and audio data by using recording and reproducing media which are randomly accessible such as hard disks is being spread.

Generally, for example, in an AV server in a broadcasting station, a data transfer rate required is high due to a demand of the image quality and sound quality and the capacity has to be large to record data of long hours. Therefore, an attempt to realize higher data transfer rate and larger capacity by using a data recording and reproducing apparatus including a plurality of hard disk drives (hereinbelow, referred to as HDDs) which store video and audio data and can be operated in parallel and an attempt to assure the reliability by recording parity data even if any of the HDDs gets out of order are made. Consequently, even when the number of channels required differs according to the contents of programs which broadcasting stations are providing and broadcasting modes, a multi-channel AV server which can accommodate various usage patterns such as a pattern of recording plural material data in a distributed manner and simultaneously transmitting the data to multichannels and a pattern of constructing a near video on demand (NVOD) system by reproducing the same material data by deviating reproduction time through multichannels can be realized.

In the data recording and reproducing apparatus which is used for such a multichannel AV server, the RAID (Redundant Arrays of Inexpensive Disks) technique proposed in "A Case for Redundant Arrays of Inexpensive Disks (RAID)", ACM SIGMOD Conference, Chicago, Ill., Jun. 1 to 3, 1988 by Patterson, D. A., Gibson, G., and Kats, R. H is employed. In the paper, RAID is classified into five classes of RAID-1 to RAID-5. Among them, representative ones are RAID-1, RAID-3, and RAID-5. As a classification for explanation, there is RAID-0 as well. RAID-0 relates to a method of operating a plurality of hard disks in parallel.

RAID-1 relates to a method of writing the same contents into two hard disks. RAID-3 relates to a method of dividing input data in predetermined length, recording divided data into a plurality of HDDs, generating parity data, and writing the parity data into another HDD. Meanwhile, RAID-5 relates to a method of setting a larger data dividing unit (block), recording one divided data as a data block into one HDD, recording the result (parity data) of the exclusive OR of data blocks corresponding each other in the HDDs as a parity block to another HDD, and distributing the parity block to all of the HDDs.

FIG. 1 is a construction diagram showing an example of the construction of an AV server using the RAID technique. An AV server 100 is used as a CM (commercials) transmitting apparatus, a news editing apparatus, or the like for providing multiple inputs and outputs of plural image data. The AV server 100 comprises a plurality of disk array apparatuses $110_1$ to $110_4$ for recording input image data and a processor 120 for inputting image data to be recorded on each of the disk array apparatuses $110_1$ to $110_4$ and outputting the image data reproduced from each of the disk array apparatuses $110_1$ to $110_4$.

In the AV server 100, for example, each of plural input image data $D_{I1}$ to $D_{In}$ (n is an integer value of 2 or larger) inputted from a video device 121 or a transmitter-receiver 122 for satellite channels is recorded into at least one of the disk array apparatuses $110_1$ to $110_4$. As required, the data recorded in the disk array apparatuses $110_1$ to $110_4$ is reproduced and outputted as output data $D_{O1}$ to $D_{On}$ to, for example, a video monitor 123 or a transmitter-receiver 124 for satellite channels.

FIG. 2 is an explanatory diagram showing an example of the structure of a disk array apparatus 110 (shown as a representative of $110_1$ to $110_4$). The disk array apparatus 110 comprises a plurality of HDDs $131_1$ to $131_5$ and a disk array controller 130 for controlling the HDDs $131_1$ to $131_5$. In the disk array apparatus 110, data in a predetermined unit (for example, a frame or GOP (Group Of Picture) unit) is written/read in parallel to/from the HDDs $131_1$ to $131_5$. The structure in which data is simply read and written in parallel is according to the method of RAID-0. In case of the method of RAID-3, one of the plurality of the HDDs $131_1$ to $131_5$ is dedicated to parity data. Although five HDDs $131_1$ to $131_5$ are shown in FIG. 2, the number of HDDs is not limited to five.

In the disk array apparatus 110, the inputted image data $D_I$ of, for example, one frame is divided, for instance, on a byte unit basis by the disk array controller 130 and the divided data is sequentially written in parallel onto hard disks in the HDDs $131_1$ to $131_5$ by the HDDs $131_1$ to $131_5$. FIG. 2 illustrates a case where data $F_1$ in the first frame and data $F_2$ of the second frame are written in parallel onto the hard disks in the HDDs $131_1$ to $131_5$. In the disk array apparatus 110, when data recorded in the HDDs $131_1$ to $131_5$ is reproduced, the data is reproduced from the HDDs $131_1$ to $131_5$ by the disk array controller 130. The reproduced data is arranged in the same order as the order upon input, formed as a collection of data, and outputted as reproduction data $D_O$.

In the disk array apparatus 110, in order to reduce the influence of seek (seeking operation) time of data in the HDDs $131_1$ to $131_5$, a certain amount (for example, few tens of frames) of data has to be accessed (read/written) in a lump per time.

Meanwhile, in the data recording and reproducing apparatus represented by the AV server 100, there is a case that variable speed reproduction of recorded data is desired to be performed. In this case, the data recording and reproduced apparatus of the related art has problems such that information necessary for the variable speed reproduction at a desired speed cannot be obtained and an information dropout occurs in a reproduction image due to the variable speed reproduction for the following reasons.

For example, in the data recording and reproducing apparatuses according to the RAID-0 and RAID-3 methods, data is written/read in parallel to/from HDDs on a unit image basis. In case of performing the variable speed reproduction, it takes time to seek image data to be reproduced next (for example, about 10 to 20 msec) every unit image. As the data reading speed, for example, the performance of about 3 frames/100 msec is the limit. In the AV server 100 which is basically multi-accessible, therefore, data can be outputted only with the performance of about few frames/second. There is consequently a problem such that information of 30 frames/second which is normally necessary cannot be acquired.

For example, in a data recording and reproducing apparatus employing RAID-5, since each unit image is recorded in individual HDD, different from the RAID-0 and RAID-3 methods, a problem caused by the seek operation does not occur. For example, however, in case of reproducing continuous frame data of frames $F_1, F_2, F_3, \ldots$ at double speed, skipped data of frames $F_1, F_3, F_5, F_7, F_9, \ldots$ is outputted, so that there is a problem such that information of data of frames $F_2, F_4, F_6, F_8, \ldots$ is not outputted. For example, in case of reproducing data at quadruple speed, data of frames $F_1, F_5, F_9, \ldots$ is outputted and information is further dropped out. Consequently, as the reproduction speed increases, the dropout in information becomes larger. Such an information dropout similarly occurs in the RAID-0 and RAID-3 methods.

In case of performing the variable speed reproduction in a VCR, there is a part called a guard band which is not magnetized between recording tracks on a video tape. Although there is a gap in a recording area, information regarding all of frames is included in a divided state in the reproduction image. Consequently, for example, there is an advantage such that information recorded instantaneously in the image like an image of a flashed part can be retrieved while performing a variable speed reproduction. On the other hand, in the data recording and reproducing apparatus, since a dropout in the information occurs on a frame unit basis, in case of retrieving a specific scene during the variable speed reproduction, there is a case that the target scene cannot be retrieved for the reason as described above.

SUMMARY OF THE INVENTION

The present invention is achieved in consideration of the problems and its object is to provide a data recording and reproducing apparatus and method capable of easily obtaining information which has few dropout and is necessary for variable speed reproduction at the time of variable speed reproduction.

A data recording and reproducing apparatus according to the invention comprises: data dividing means for dividing input image data into a plurality of parts on a predetermined data unit basis, thereby generating data divided in a plurality of groups; recording and reproducing means for recording the divided data onto a plurality of recording media divided in a plurality of groups in correspondence with the number of groups of the divided data and reproducing the recorded divided data as required; image data forming means for forming desired image data on the basis of the divided data reproduced by the recording and reproducing means; and control means for controlling the recording and reproducing means so that the divided data of each group is recorded onto the recording media of the different groups respectively, while the relation between the groups of the divided data and the groups of the recording media is periodically changed in a predetermined pattern on the predetermined data unit basis.

A data recording and reproducing method according to the invention comprises the steps of: dividing input image data into a plurality of parts on a predetermined data unit basis, thereby generating data divided in a plurality of groups; recording the divided data onto a plurality of recording media on a group unit basis so as to be recorded onto the recording media of a different group respectively, while periodically changing the relation between the groups of the divided data and the groups of a plurality of recording media grouped in correspondence with the number of groups of the divided data, and reproducing the recorded divided data as required; and forming desired image data on the basis of the divided data reproduced.

In the recording and reproducing apparatus of the invention, input image data is divided into a plurality of parts on a predetermined data unit basis by the data dividing means. The recording and reproducing means is controlled by the control means to record the divided data in groups onto the recording media of different groups while periodically changing the relation between the groups of the divided data and the groups of the plurality of recording media grouped in correspondence with the number of groups of the divided data in a predetermined pattern on the predetermined data unit basis.

In the data recording and reproducing method according to the invention, input image data is divided into a plurality of parts on a predetermined data unit basis, thereby forming divided data divided in a plurality of groups. Recording is performed to the plurality of recording media so that the divided data is recorded on a group unit basis into the recording media of different groups while the relation between the groups of the divided data and the groups of the plurality of recording media divided into a plurality of groups in correspondence with the number of groups of the divided data is periodically changed in a predetermined pattern on a predetermined data unit basis, the recorded divided data is reproduced as required, and desired image data is formed on the basis of the reproduced divided data.

Other and further objects, features and advantages of the invention will appear more fully from the following description.

BRIEF DESCRIPTION OF THE DRAWINGS

FIG. 6 is an explanatory diagram showing an example of an image dividing method executed in the input-output processor apparatus illustrated in FIG. 5.

FIG. 7 is an explanatory diagram showing another example of the image dividing method executed in the input-output processor apparatus illustrated in FIG. 5.

FIG. 8 is an explanatory diagram showing further another example of the image dividing method executed in the input-output processor apparatus illustrated in FIG. 5.

FIG. 10 is an explanatory diagram for explaining the relation between a plurality of HDDs which are divided into a plurality of groups and groups of data recorded onto the HDDs in the AV server shown in FIG. 3.

FIG. 11 is an explanatory diagram for explaining a method of reproducing data in the case where a reproduction operation at double speed is carried out in the AV server shown in FIG. 3.

FIG. 12 is an explanatory diagram for explaining a data reproducing method when a reproduction operation at quadruple speed is executed in the AV server shown in FIG. 3.

FIG. 13 is an explanatory diagram continued from FIG. 12.

FIG. 14 is an explanatory diagram for explaining a data reproducing method when a reproduction operation at octuple speed is performed in the AV server shown in FIG. 3.

FIG. 15 is an explanatory diagram continued from FIG. 14.

FIG. 16 is an explanatory diagram continued from FIG. 15.

FIG. 17 is an explanatory diagram continued from FIG. 16.

FIG. 20 is an explanatory diagram showing an example of the data recording and reproducing method when the HDDs are grouped on the GOP unit basis.

FIG. 21 is another explanatory diagram showing an example of the data recording and reproducing method when the HDDs are grouped on the GOP unit basis.

FIG. 22 is an explanatory diagram for explaining the data structure of a compressed image.

FIG. 23 is another explanatory diagram for explaining the data structure of a compressed image.

DETAILED DESCRIPTION OF THE PREFERRED EMBODIMENTS

Preferred embodiments of the invention will now be described in detail with reference to the accompanying drawings.

Figure 1:
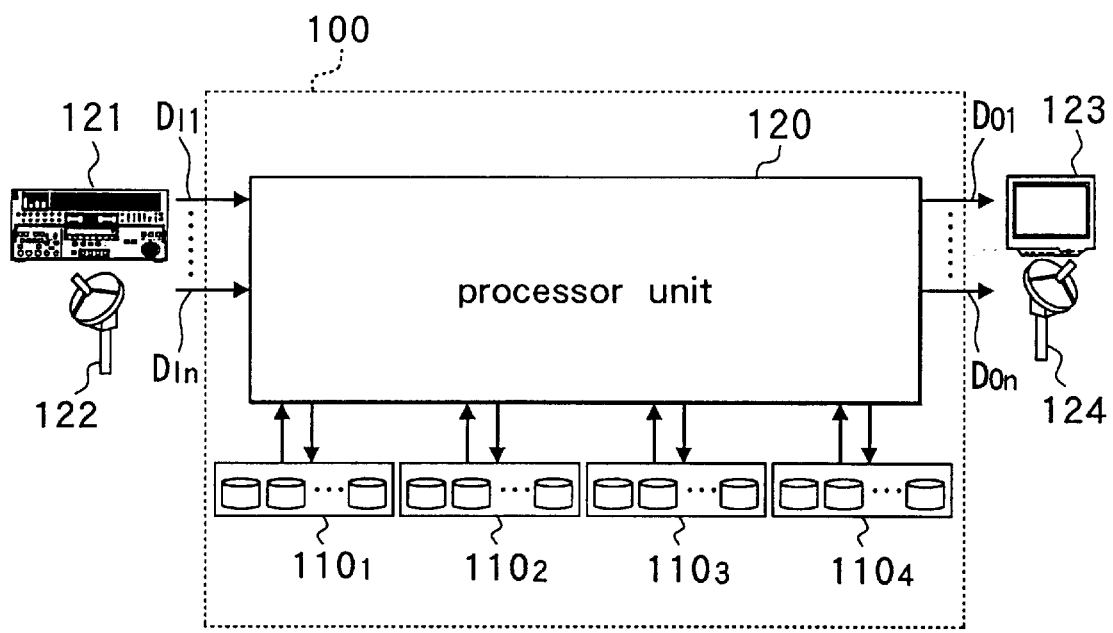
FIG. 1 is a construction diagram showing an example of an AV server of a related art.
Figure 2:
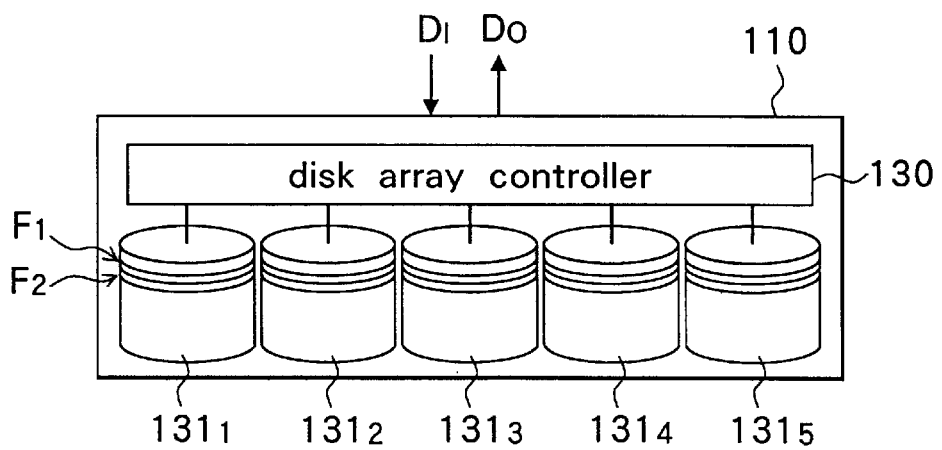
FIG. 2 is a construction diagram showing the construction of a disk array apparatus illustrated in FIG. 1.
Figure 3:
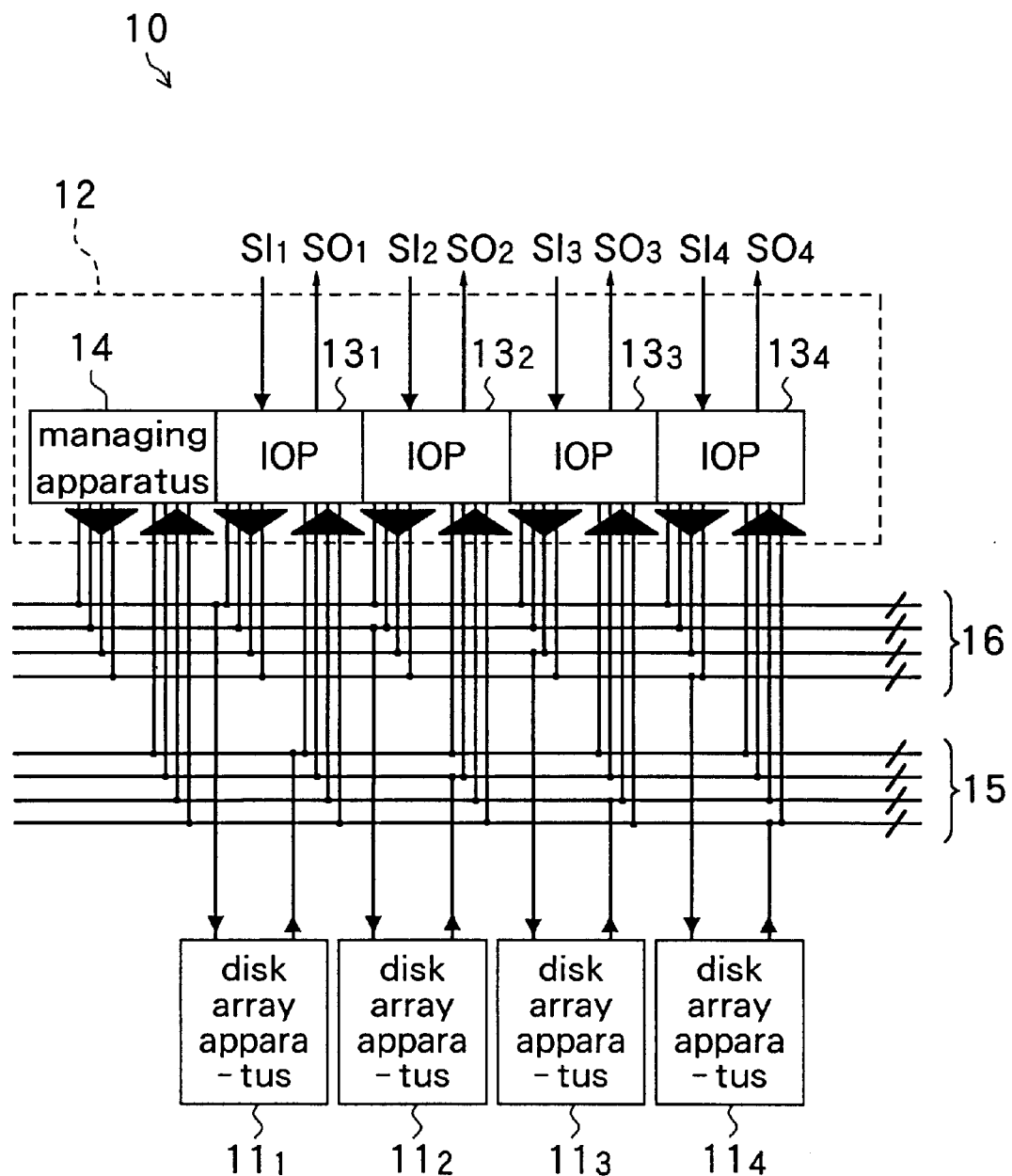
FIG. 3 is a block diagram showing an example of the construction of an AV server as a data recording and reproducing apparatus according to an embodiment of the invention.

FIG. 3 is a block diagram showing an example of an AV server 10 as a data recording and reproducing apparatus according to an embodiment of the invention. The AV server 10 is used as a CM transmitting apparatus, a news editing apparatus, or the like for providing multiple inputs and outputs of plural image data. The AV server 10 comprises a plurality of RAID-structured disk array apparatuses $11_1$ to $11_n$ (n is an integer value of 2 or larger, the diagram showing an example where n is 4) and an input-output processor unit 12 for inputting data to be recorded onto the disk array apparatuses $11_1$ to $11_n$ and outputting the data reproduced from the disk array apparatuses $11_1$ to $11_n$. Each of the disk array apparatuses $11_1$ to $11_n$ corresponds to an example of recording and reproducing means in the invention.

The input-output processor unit 12 has a plurality of input-output processor apparatuses (described as "IOP" in the diagram) $13_1$ to $13_m$ (m is an integer value of 2 or larger, an example where m is 4 is shown in the diagram) for executing an access for recording/reproducing data to/from each of the disk array apparatuses $11_1$ to $11_n$ in a time sharing manner on a time slot unit basis as time breaks obtained by dividing a predetermined time interval into a plurality of parts, and a managing apparatus 14 for managing material information or the like. Each of the input-output processor apparatuses $13_1$ to $13_m$ corresponds to an example of image data forming means and control means in the invention.

The input-output processor apparatuses $13_1$ to $13_m$, the managing apparatus 14, and the disk array apparatuses $11_1$ to $11_n$ are connected via up data buses 15 and down data buses 16. The up data buses 15 of the number equal to the number of disk array apparatuses $11_1$ to $11_n$ and the down data buses 16 of the same number exist. One disk array apparatus $11_i$ (i is an arbitrary integer value from 1 to n), the input-output processor apparatuses $13_1$ to $13_m$, and the managing apparatus 14 are connected to one up data bus 15 and one down data bus 16. More specifically, one input-output processor apparatus $13_j$ (j is an arbitrary integer value from 1 to m) and the managing apparatus 14 are connected to the plurality of up data buses 15 and the plurality of down data buses 16. In the embodiment, the down data bus 16 is a bus for transferring data directed from the input-output processor apparatuses $13_1$ to $13_m$ and the managing apparatus 14 to the disk array apparatuses $11_1$ to $11_n$ and the up data bus 15 is a bus for transferring data in the opposite direction.

In the event of data recording, each of the input-output processor apparatuses $13_j$ converts an input signal $SI_j$ such as a video signal to image data of a predetermined format and transmits the image data and a command for instructing recording of the image data to each of the disk array apparatuses $11_1$ to $11_n$ via the down data bus 16. In the event of data reproduction, each of the input-output processor apparatuses $13_j$ transmits a command for instructing reproduction of data to each of the disk array apparatuses $11_1$ to $11_n$ via the down data bus 16, converts the data reproduced by each of the disk array apparatuses $11_1$ to $11_n$ and transfers via the up data bus 15 into a predetermined signal, and outputs the signal as an output signal $SO_j$ to the outside.

Each disk array apparatus $11_i$ has a plurality of HDDs for recording input data and parity data. In the event of data recording, each disk array apparatus $11_i$ receives input data and a command from the input-output processor apparatus $13_j$ via the down data bus 16, divides the input data on a predetermined data unit basis to thereby form plural divided data, generates parity data on the basis of the input data, and records the divided data and the parity data into the plurality of HDDs in accordance with the command. In the event of data reproduction, each disk array apparatus $11_i$ receives the command from the input-output processor apparatus $13_j$ via the down data bus 16, controls the plurality of HDDs in accordance with the command, reproduces the divided data and the parity data, executes an error correcting process to the divided data by using the parity data, multiplexes the divided data after the error correcting process, and outputs the multiplexed data as output data to the input-output processor apparatus $13_j$ via the up data bus 15.

Figure 5:
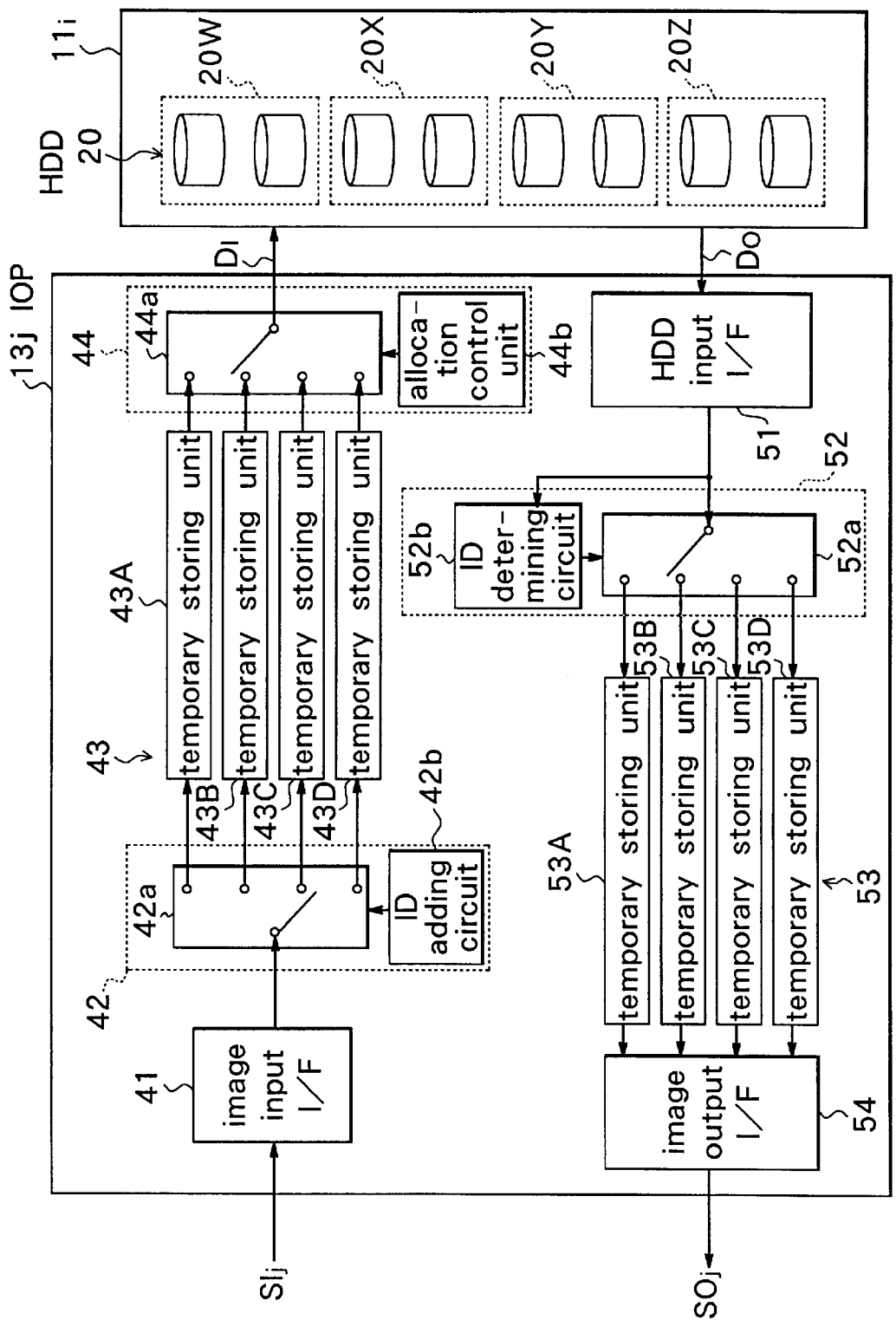
FIG. 5 is a block diagram showing the construction of an input-output processor apparatus in FIG. 3.

FIG. 5 is a block diagram showing the construction of the input-output processor apparatus $13_j$. In the diagram, the up data buses 15 and the down data buses 16 are omitted. The input-output processor apparatus $13_j$ comprises: an image input interface (described as I/F in the diagram) 41 for converting the input signal $SI_j$ into image data of a predetermined format; an image group dividing unit 42 for dividing the image data outputted from the image input interface 41 on a unit image basis into a plurality of image groups (for example, four groups A to D) to thereby form plural divided data; an image data temporary storing unit 43 for temporarily storing the plural divided data in the image groups formed by the image group dividing unit 42 at least of a predetermined image unit amount (for example, a unit of 16 frames); and an HDD output interface unit 44 for combining the divided data in the predetermined image unit (for example, the unit amount of 16 frames) temporarily stored in the image data temporary storing unit 43 and outputting the image data $D_I$ of a predetermined data stream structure to the disk array apparatus 11$i$. In this case, the image group dividing unit 42 mainly corresponds to an example of data dividing means in the invention.

The image data temporary storing unit 43 includes temporary storing units 43A to 43D for the respective groups for storing the divided data in the four groups A to D. The image group dividing unit 42 includes a switch 42$a$ for selectively switching and outputting the grouped divided data every image group to the temporary storing units 43A to 43D and an ID adding circuit 42$b$ for adding a group ID (identification information) as group information indicating the group to which the divided data belongs to the head of the divided data on a unit image basis. The HDD output interface unit 44 includes: a switch 44$a$ for selectively switching the connection state to the temporary storing units 43A to 43D to selectively acquire the divided data stored in the temporary storing units 43A to 43D; and an allocation control unit 44$b$ for controlling the switching of the connection state in the switch 44$a$ and converting the divided data acquired from the temporary storing units 43A to 43D into the data $D_I$ of the predetermined data stream structure. The ID adding circuit 42$b$ in the image group dividing unit 42 and the HDD output interface unit 44 mainly correspond to an example of adding means in the invention.

The input-output processor apparatus 13$_j$ comprises: an HDD input interface unit 51 for reading the image data $D_O$ of a predetermined image unit amount (for example, a unit of 16 frames) from the disk array apparatus 11$_i$ and outputting the image data; an image group detecting unit 52 for detecting the group information of the image data outputted from the HDD input interface unit 51 on the unit image basis, dividing the image data on the basis of the detected group information, and outputting the divided data; an image data temporary storing unit 53 for temporarily storing the divided data outputted from the image group detecting unit 52 on the image group unit basis; and an image output interface 54 for combining the divided data temporarily stored in the image data temporary storing unit 53, converting the combined data into a predetermined signal, and outputting the converted data as an output signal $SO_j$ to the outside.

The image data temporary storing unit 53 includes temporary storing units 53A to 53D for the respective groups for storing the divided data grouped in the groups A to D, respectively. The image group detecting unit 52 includes: a switch 52$a$ for selectively switching and outputting the image data outputted from the HDD input interface unit 51 every image group to the temporary storing units 53A to 53D; and an ID determining circuit 52$b$ for determining the group ID as group information of the image data on the unit image basis and controlling the switch of the connection state in the switch 52$a$ on the basis of the determined group information.

Although not illustrated, a speed control unit for controlling a data reproduction speed and the like is included in the input-output processor apparatus 13$_j$. The speed control unit controls, for example, storage areas of the divided data in the temporary storing units 53A to 53D in accordance with the reproduction speed and controls from which storage areas in the temporary storing units 53A to 53D the data should be read in accordance with the reproduction speed.

FIGS. 6 to 8 are explanatory diagrams each showing an example of the image dividing method. FIG. 6 shows an example in which the unit image is equally divided into four images of groups A to D in the vertical direction. FIG. 7 shows an example in which the unit image is equally divided into two in both vertical and lateral directions, thereby obtaining the divided images of four groups A to D. FIG. 8 shows an example in which the unit image is equally divided into four parts in the vertical direction and equally divided into five parts in the lateral direction, thereby dividing the unit image into 20 divided blocks in total and circularly grouping the divided blocks into the images of four groups A to D. The image dividing method is not limited to the examples shown in the diagrams but other methods can be also used. The image group dividing unit 42 divides the image data into a plurality of image groups on the unit image basis by, for example, the dividing methods shown in FIGS. 6 to 8, selectively switching the grouped divided data every image group, for example, byte by byte to the temporary storing units 43A to 43D.

Figure 9:
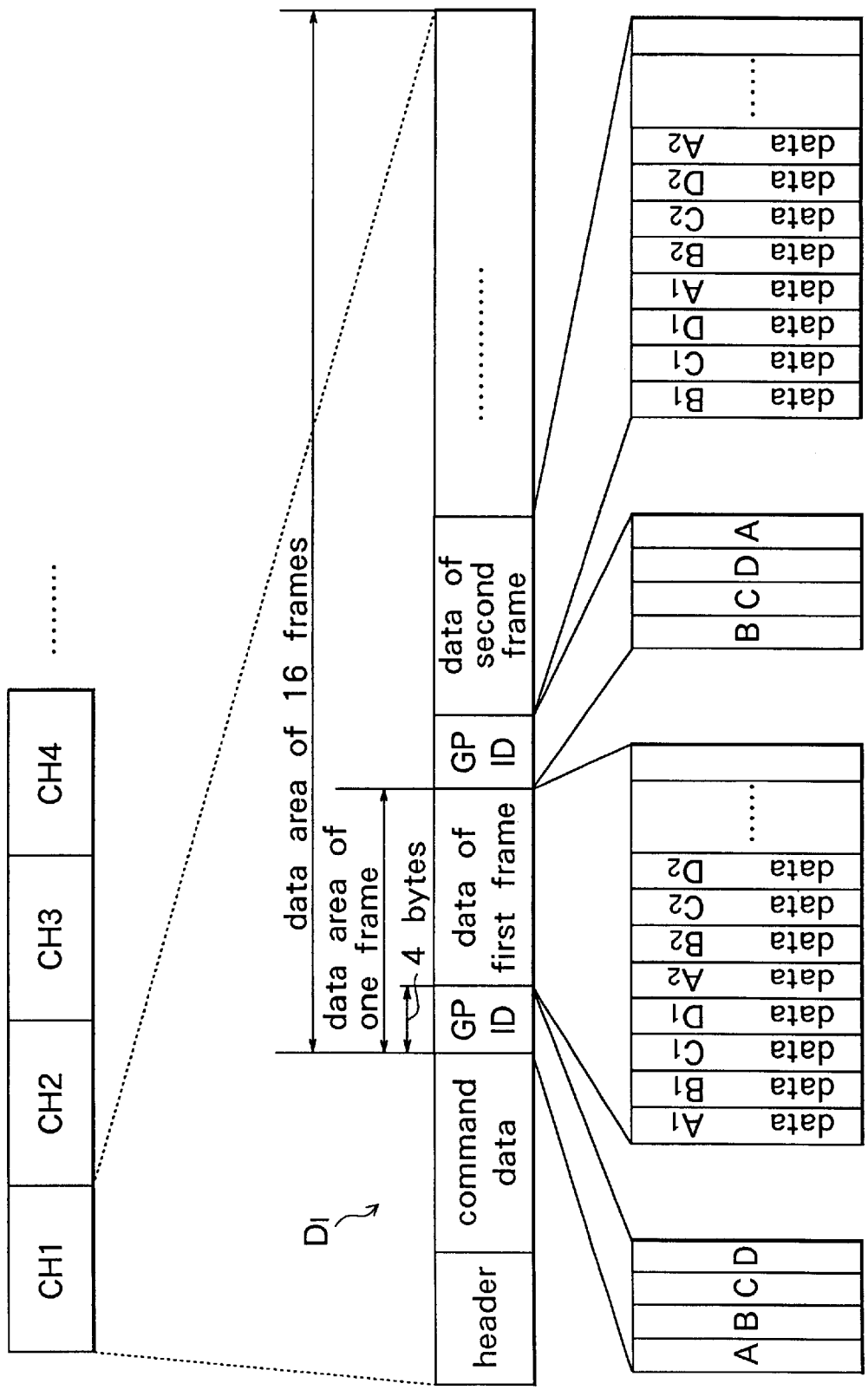
FIG. 9 is an explanatory diagram showing the structure of a data stream outputted from the input-output processor apparatus illustrated in FIG. 5.

FIG. 9 is an explanatory diagram showing an example of the data structure of image data $D_I$ as a predetermined data stream outputted from the HDD output interface unit 44. The AV server 10 in the embodiment can input and output data of a plurality of channels. For example, data CH1 to CH4 of four channels are inputted and outputted. The data $D_I$ outputted from the HDD output interface unit 44 is, for instance, data relating to the data CH1 of one of the plurality of channels. The data $D_I$ outputted from the HDD output interface unit 44 is comprised of a header indicative of the head of the data, a command data part in which command data for control to the disk array apparatus 11$_i$ is stored, and a data area in which substantial image data of a predetermined image unit (for example, unit of 16 frames) is stored.

In the data area, substantial data in each image group is described in the data area of one frame in order, for example, on a byte unit basis. The arrangement order of data varies from a frame to another. For example, data in the first frame is described in the order of $A_1$, $B_1$, $C_1$, $D_1$, $A_2$, $B_2$ ... and data in the second frame is described in the order of $B_1$, $C_1$, $D_1$, $A_1$, $B_2$, $C_2$ ... The arrangement order of data changes periodically in a predetermined pattern, for example, the order is circulated every four frames.

Information of the group ID (GPID) of each frame is added at the head portion of the substantial image data of each frame. As the information of the group ID, the ID (A to D) as the name of each image group is described in the order corresponding to the order of data arrangement. That is, by the information of the group ID, the group of the data and the arrangement order of the data can be known. The HDD output interface unit 44 controls switching of the connection state in the switch 44$a$ in the allocation control unit 44$b$, selectively acquires the divided data stored in the temporary storing units 43A to 43D every image group, for example, byte by byte, constructs the data $D_I$ so as to have the data structure shown in FIG. 9, and outputs the resultant data to the disk array apparatus 11.

Figure 4:
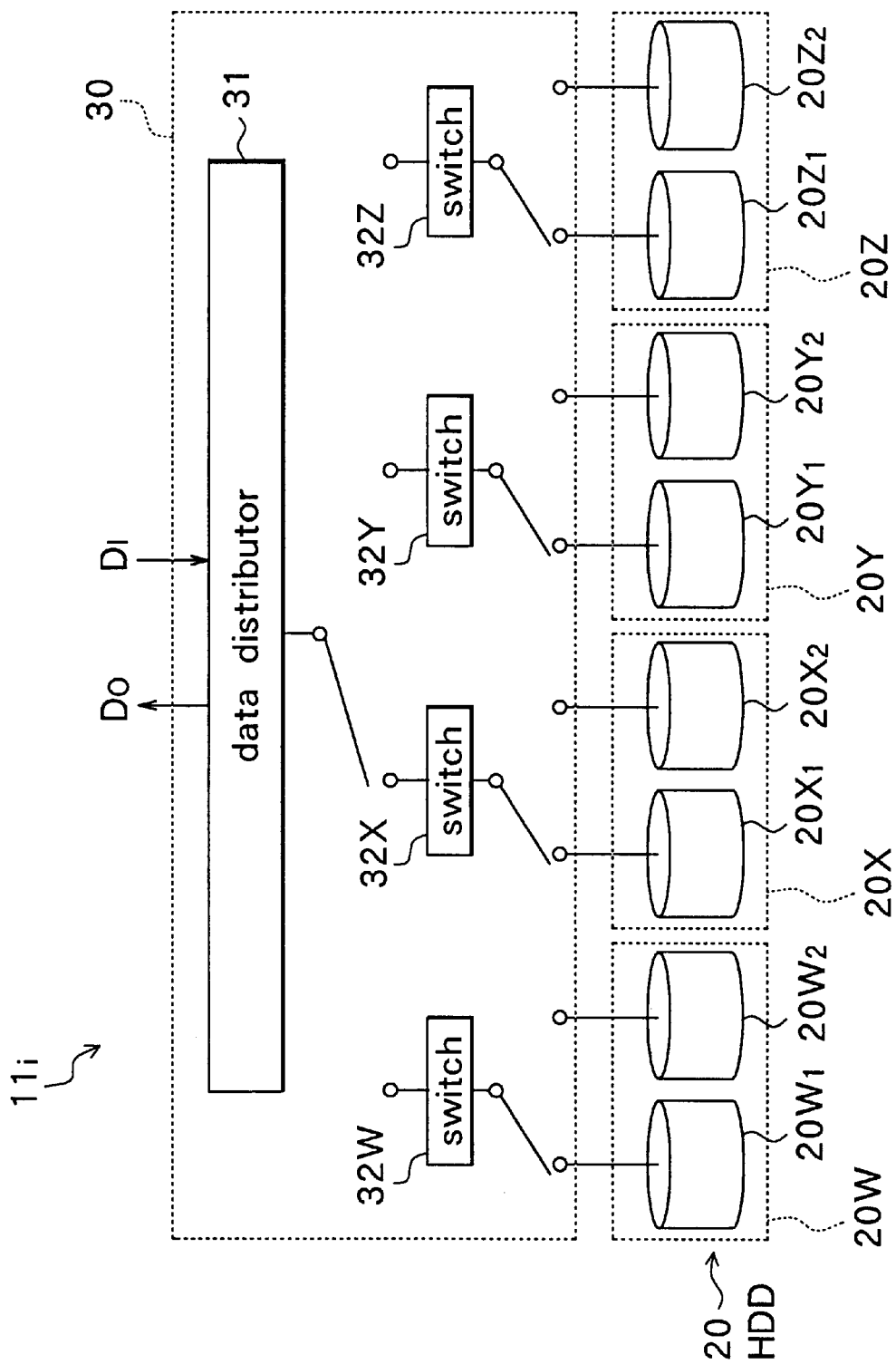
FIG. 4 is a block diagram showing the construction of a disk array apparatus in FIG. 3.

FIG. 4 is a block diagram showing the construction of the disk array apparatus 11$_i$. The disk array apparatus 11$_i$ comprises a plurality of HDDs 20 in which the data recording and reproducing operation is substantially executed and a disk array controller 30 for controlling the plurality of the HDDs 20. In the disk array apparatus 11$_i$, data is parallelly written/read to/from the plurality of HDDs 20 on a predetermined unit basis (for example, on a frame or GOP unit basis). The structure in which data is simply written/read in parallel is according to the method of RAID-0. In case of the method of RAID-3, one of the plurality of the HDDs 20 is dedicated to the parity data. In the diagram, an HDD for parity data is omitted. Although eight HDDs are shown in the diagram, the number of HDDs is not limited to eight.

The HDDs 20 are divided into four HDD groups 20W, 20X, 20Y, and 20Z. The HDD 20W includes two HDDs 20W$_1$ and 20W$_2$ and the HDD 20X includes two HDDs 20X$_1$ and 20X$_2$. Similarly, the HDD 20Y includes two HDDs 20Y$_1$ and 20Y$_2$ and the HDD 20Z includes two HDDs 20Z$_1$ and 20Z$_2$.

The disk array controller 30 comprises: a data distributor 31 to which the data D$_I$ is inputted from the input-output processor apparatus 13$_j$ at the time of data recording and from which the data D$_O$ is outputted to the input-output processor apparatus 13$_j$ at the time of data reproduction; and switches 32W, 32X, 32Y, and 32Z to which data is inputted from the data distributor 31 at the time of data recording and which selectively output the data from the HDDs 20W, 20X, 20Y, and 20Z to the data distributor 31 at the time of data reproduction, respectively.

At the time of data recording, the data distributor 31 outputs the data D$_I$ inputted from the input-output processor apparatus 13 selectively to the switches 32W, 32X, 32Y, and 32Z, for example, on a byte unit basis. At the time of data reproduction, the data distributor 31 selectively obtains data, for example, on a byte unit basis from the switches 32W, 32X, 32Y, and 32Z, combines the acquired data into the data D$_O$ of, for example, 16 frames, and outputs the data D$_O$ to the input-output processor apparatus 13$_j$.

At the time of data recording, the switch 32W outputs the data selectively inputted from the input-output processor apparatus 13$_j$ to selectively either the HDD 20W$_1$ or 20W$_2$. At the time of data reproduction, the switch 32W selectively acquires data, for example, in a byte unit from either the HDD 20W$_1$ or 20W$_2$ and outputs the data to the input-output processor apparatus 13$_j$. The other switches 32X, 32Y, and 32Z operate in a manner similar to the switch 32W.

FIG. 10 is an explanatory diagram for explaining the relation between the HDDs 20W, 20X, 20Y, and 20Z and the groups of data recorded in the HDDs 20W, 20X, 20Y, and 20Z. In the diagram, data D$_I$ successively accessed in a single operation of the disk array apparatus 11$_i$ is in the area surrounded by the thickest line. In the diagram, for example, the shaded part shows that the data in the first frame recorded in the HDD 20W is data classified into the image group A. It also shows that the data in the first frames recorded in the HDDs 20X, 20Y, and 20Z is classified into the image groups B, C, and D, respectively. In the embodiment, the relation between the HDDs 20W, 20X, 20Y, and 20Z and the groups of data recorded into the HDDs periodically changes in a predetermined pattern. In the example shown in the diagram, data is recorded into the HDDs 20W, 20X, 20Y, and 20Z so that the group is circulated every four frames. Such circulative data recording is realized by allocating and recording the data D$_I$ having the structure shown in FIG. 9 inputted from the input-output processor apparatus 13$_j$ sequentially to the HDDs 20W, 20X, 20Y, and 20Z, for example, on a byte unit basis by the data distributor 31 in the disk array apparatus 11$_i$.

In the HDD 20 having the recording structure as described above, when reproduction is performed at normal speed, reproduction data F$_1$ reproduced as data of the first frame is constructed by data 1A, 1B, 1C, and 1D recorded in the recording areas of the first frames of the HDDs 20W, 20X, 20Y, and 20Z. Reproduction data F$_2$ reproduced as data of the second frame is constructed by data 2B, 2C, 2D, and 2A recorded in the recording areas of the second frames of the HDDs 20W, 20X, 20Y, and 20Z. In the embodiment, when the reproduction is performed at normal speed, the structure of data outputted finally is similar to that of the related art.

FIGS. 11 to 17 are explanatory diagrams for explaining a data reproducing method when reproduction is performed at variable speeds in the HDD 20 having the recording structure as described above. In each of the diagrams, the area surrounded by the thickest line is a data area successively accessed by a single operation of the disk array apparatus 11$_i$. FIG. 11 shows a case where a reproduction operation at double speed is performed. FIGS. 12 and 13 illustrate a case where a reproduction operation at quadruple speed is performed. FIGS. 14 to 17 show a case where a reproduction operation at octuple speed is performed.

As shown in FIG. 11, when the reproduction operation at the double speed is carried out, the frame numbers of data accessed by a single operation in the HDDs 20W and 20Y and those in the HDDs 20X and 20Z are different. For example, when data of the 1st to 16th frames is read in each of the HDDs 20W and 20Y, data of the 17th to 32nd frames is read in each of the HDDs 20X and 20Z.

When the reproduction operation at the double speed is carried out, reproduction data F$_1$ reproduced as data of the first frame is constructed by the data 1A and 2B recorded in the recording areas of the first and second frames of the HDD 20W and the data 1C and 2D recorded in the recording areas of the first and second frames of the HDD 20Y. Reproduction data F$_2$ reproduced as data of the second frame is constructed by the data 3C and 4D recorded in the recording areas of the third and fourth frames of the HDD 20W and the data 3A and 4B recorded in the recording areas of the third and fourth frames of the HDD 20Y. For example, reproduction data F reproduced as data in the ninth frame is constructed by data 17B and 18C recorded in the recording areas of the 17th and 18th frames of the HDD 20X and data 17D and 18A recorded in the recording areas of the 17th and 18th frames of the HDD 20Z. As described above, in the embodiment, different from the related art, when the reproduction at the double speed is performed, information regarding all of the frames is included in the reproduction data which is outputted finally.

As shown in FIGS. 12 and 13, when the reproduction operation at quadruple speed is performed, the frame numbers of data accessed by a single operation differ according to the HDDs 20W, 20Y, 20X and 20Z. For example, when data of the 1st to 16th frames is read in the HDD 20W, data of the 17th to 32nd frames is read in the HDD 20X. In this case, data of the 33rd to 48th frames is read in the HDD 20Y and data of the 49th to 64th frames is read in the HDD 20Z.

When the reproduction operation at quadruple speed is carried out, reproduction data F$_1$ reproduced as data of the first frame is constructed by data 1A, 2B, 3C, and 4D recorded in the recording areas of the first to fourth frames of the HDD 20W. Reproduction data F$_2$ reproduced as data of the second frame is constructed by data 5A, 6B, 7C, and 8D recorded in the recording areas of the fifth to eighth frames of the HDD 20W. For example, reproduction data F$_9$ reproduced as data in the ninth frame is constructed by data 33C, 34D, 35A, and 36B recorded in the recording areas of the 33rd to 36th frames of the HDD 20Y. In the embodiment as mentioned above, when the reproduction at quadruple speed is performed, different from the related art, information regarding all of the frames is included in reproduction data which is outputted finally.

As shown in FIGS. 14 to 17, when the reproduction operation at octuple speed is performed, the frame number of data accessed by a single operation varies among the HDDs 20W, 20X, 20Y, and 20Z. When the reproduction operation at octuple speed is performed, it is necessary to access the recording area of data in every other four frames during a single-time access operation in each of the HDDs 20W, 20X, 20Y, and 20Z. In the embodiment, therefore, the disk array apparatus $11_i$ has a construction in which seeking operations can be performed four times during a single access operation.

When the reproduction operation at octuple speed is performed, for example, in the HDD 20W, the recording areas of data of the 1st to 4th frames, data of the 9th to 12th frames, data of the 17th to 20th frames, and data of the 25th to 28th frames are accessed during one access (during one access operation). In the HDD 20X, the recording areas of data of the 33rd to 36th frames, data of the 41st to 44th frames, data of the 49th to 52nd frames, and data of the 57th to 60th frames are accessed during one access. Further, in the HDD 20Y, the recording areas of data of the 65th to 68th frames, data of the 73rd to 76th frames, data of the 81st to 84th frames, and data of the 89th to 92nd frames is accessed during a single access. Further, in the HDD 20Z, the recording areas of data of the 97th to 100th frames, data of the 105th to 108th frames, data of the 113rd to 116th frames, and data of the 121st to 124th frames is accessed during a single access.

When the reproduction operation at octuple speed is performed, the reproduction data $F_1$ reproduced as data of the first frame is constructed by the data 1A, 2B, 3C, and 4D recorded in the 1st to 4th frames in the HDD 20W. Reproduction data $F_2$ reproduced as data of the second frame is constructed by data 9A, 10B, 11C, and 12D recorded in the recording areas of the 9th to 12th frames of the HDD 20W. For example, reproduction data $F_5$ reproduced as data of the fifth frame is constructed by data 33B, 34C, 35D, and 36A recorded in the recording areas of the 33rd to 36th frames of the HDD 20X. In the embodiment as mentioned above, when the reproduction at the octuple speed is performed, recording data of frames different according to the image groups is included in reproduction data which is outputted finally. The amount of data drop-outs is reduced as compared with the related art.

The operation of the AV server 10 having the above construction will now be described. The following description is also the description of the data recording and reproducing method according to the embodiment.

In case of data recording, in the input-output processor apparatus $13_j$, the input signal $SI_j$ such as a video signal is converted to image data of a predetermined format. The data and the command for instructing recording of the data is transmitted via down data buses 16 to each of the disk array apparatuses $11_1$ to $11_n$.

More specifically, in the input-output processor apparatus $13_j$, the input signal $SI_j$ is converted into image data of a predetermined format in the image input interface 41. In the image group dividing unit 42, the image data outputted from the image input interface 41 is divided into a plurality of image groups (for example, four groups A to D) on the unit image basis, thereby generating plural divided data. In the image data temporary storing unit 43, at least a predetermined image unit (for example, unit of 16 frames) of the plurality of divided data generated by the image group dividing unit 42 is temporarily stored on the image group basis. In the HDD output interface unit 44, the divided data in the predetermined image unit (for example, unit of 16 frames) temporarily stored in the image data temporary storing unit 43 is combined and outputted as image data $D_I$ having a predetermined data stream structure to the disk array apparatus $11_i$.

In the image group dividing unit 42, for example, the image data is divided into a plurality of image groups on the image unit basis by any of the dividing methods shown in FIGS. 6 to 8 and the data divided into groups is selectively switched and outputted to the temporary storing units 43A to 43D in the image data temporary storing unit 43 every image group, for example, byte by byte. In the HDD output interface unit 44, the switching of the connection state in the switch 44a is controlled by the allocation control unit 44b. The data $D_I$ is constructed so as to have the data structure shown in FIG. 9 by selectively acquiring the divided data stored in the temporary storing units 43A to 43D every image group, for example, byte by byte and the data $D_I$ is outputted to the disk array apparatus $11_i$.

In each disk array apparatus $11_i$, the input data and the command are received from the input-output processor apparatus $13_j$ via the down data bus 16 and the input data is sequentially recorded according to the command into the plurality of HDDs on a byte unit basis.

More specifically, in each disk array apparatus $11_i$, the data distributor 31 in the disk array controller 30 selectively outputs the data $D_I$ supplied from the input-output processor apparatus $13_j$ to the switches 32W, 32X, 32Y, and 32Z, for example, on a byte unit basis. In the switch 32W, the data selectively inputted from the input-output processor apparatus $13_j$ is selectively outputted to either the HDD $20W_1$ or $20W_2$. Operations similar to those in the switch 32W are performed in each of the other switches 32X, 32Y, and 32Z. The relation between the HDDs 20W, 20X, 20Y, and 20Z and the groups of data recorded into the HDDs is changed periodically in a predetermined pattern. For example, as shown in FIG. 10, the data is recorded into the HDDs 20W, 20X, 20Y, and 20Z so that the groups circulate every four frames. The circulative recording of the data is realized by sequentially allocating and recording the data $D_I$ having the structure shown in FIG. 9 inputted from the input-output processor apparatus $13_j$ to the HDDs 20W, 20X, 20Y, and 20Z, for example, on a byte unit basis by the data distributor 31 in the disk array apparatus $11_i$.

When the data is reproduced, in each input-output processor apparatus $13_j$, the command for instructing data reproduction is transmitted via the down data bus 16 to each of the disk array apparatuses $11_1$ to $11_n$, the data reproduced by the disk array apparatuses $11_1$ to $11_n$ and transferred via the up data buse 15 is converted into predetermined signals and outputted as output signals $SO_j$ to the outside. In each disk array apparatus $11_i$, the command is received from the input-output processor apparatus $13_j$ via the down data bus 16, the plurality of HDDs are controlled according to the command, the data on the predetermined data unit is reproduced, and the reproduced data is outputted via the up data bus 15 to the input-output processor apparatus $13_j$.

More specifically, in each disk array apparatus $11_i$, for example, in the switch 32W in the disk array controller 30, data in a byte unit is selectively outputted from either the HDD $20W_1$ or $20W_2$. An operation similar to that of the switch 32W is performed in each of the other switches 32X, 32Y, and 32Z. The data distributor 31 of the disk array controller 30 selectively acquires data, for example, on the byte unit basis from the switches 32W, 32X, 32Y, and 32Z, combines the acquired data into, for instance, the data $D_1$ of 16 frames, and outputs the data $D_0$ to the input-output processor apparatus $13_j$.

When the reproduction is carried out at normal speed, in the disk array apparatus $11_i$, for example, as shown in FIG. 10, the data $D_I$ of 16 frames is reproduced in a lump by a single accessing operation. The reproduction data $F_1$ reproduced as data of the first frame is constructed by the data 1A, 1B, 1C, and 1D recorded in the recording areas of the first frames of the HDDs 20W, 20X, 20Y, and 20Z and is outputted. The reproduction data $F_2$ reproduced as data of the second frame is constructed by the data 2B, 2C, 2D, and 2A recorded in the recording areas of the second frames of the HDDs 20W, 20X, 20Y, and 20Z and is outputted.

When the reproduction operation is performed at double speed, in the disk array apparatus $11_i$, the frame numbers of data accessed by a single operation in the HDDs 20W and 20Y and those in the HDDs 20X and 20Z are made different. For example, as shown in FIG. 11, in case of reading data of the 1st to 16th frames in the HDDs 20W and 20Y, data of the 17th to 32nd frames is read in the HDDs 20X and 20Z. In this case, for instance, the reproduction data $F_1$ reproduced as data of the first frame is constructed by the data 1A and 2B recorded in the recording areas of the first and second frames of the HDD 20W and the data 1C and 2D recorded in the recording areas of the first and second frames of the HDD 20Y and is outputted.

When the reproduction operation at quadruple speed is performed, in the disk array apparatus $11_i$, the frame numbers of data accessed by a single operation are made different among the HDDs 20W, 20X, 20Y, and 20Z. For example, as shown in FIGS. 12 and 13, in case of reading the data of the 1st to 16th frames in the HDD 20W, data of the 17th to 32nd frames is read in the HDD 20X, data of the 33rd to 48th frames is read in the HDD 20Y, and data of the 49th to 64th frames is read in the HDD 20Z. In this case, for instance, the reproduction data $F_1$ reproduced as data of the first frame is constructed by the data 1A, 2B, 3C, and 4D recorded in the recording areas of the 1st to 4th frames of the HDD 20W and outputted.

When the reproduction operation at octuple speed is performed, in the disk array apparatus $11_i$, the frame numbers of data accessed by a single operation are made different among the HDDs 20W, 20X, 20Y, and 20Z. For example, as shown in FIGS. 14 to 17, in each of the HDDs 20W, 20X, 20Y, and 20Z, the data in the recording areas is accessed every other four frames in a single access operation. In this case, for example, the reproduction data $F_1$ reproduced as data of the first frame is constructed by the data 1A, 2B, 3C, and 4D recorded in the recording areas of the 1st to 4th frames of the HDD 20W.

In each input-output processor apparatus $13_j$, the image data $D_0$ in the predetermined image unit (for example, unit of 16 frames) is read from the disk array apparatus $11_i$ in the HDD input interface unit 51. In the image group detecting unit 52, the group information of the image data outputted from the HDD input interface unit 51 is detected on the image unit basis, the image data is divided on the basis of the detected group information, and the divided data is outputted. In the image data temporary storing unit 53, for example, 16 frames of the divided data outputted from the image group detecting unit 52 is temporarily stored every image group. In the image output interface 54, the temporary stored divided data is combined, converted into a predetermined signal, and outputted as an output signal $SO_j$ to the outside.

In the image data temporary storing unit 53, the divided data grouped in the groups A to D is stored in each of the temporary storing units 53A to 53D. In the image group detecting unit 52, the group ID as group information of the image data is determined every image unit by the ID determining circuit 52b, the connection state in the switch 52a is switched on the basis of the determined group information, and the image data outputted from the HDD input interface unit 51 is selectively switched and outputted to the temporary storing units 43A to 43D every image group.

In the input-output processor apparatus 13, a speed control unit (not shown) controls the storing areas of the divided data in the temporary storing units 53A to 53D in accordance with the reproduction speed and controls from which storing area in the temporary storing units 53A to 53D the data is to be read.

As described above, according to the AV server 10 in the embodiment, the input data is divided into a plurality of parts on the predetermined data unit basis, the divided data grouped in, for example, the groups A to D is recorded in the HDDs 20W, 20X, 20Y, and 20Z of different groups every group of the divided data, and the relation between the groups of the divided data and the groups of the HDDs 20W, 20X, 20Y, and 20Z is changed periodically in a predetermined pattern. Consequently, at the time of the variable speed reproduction, the recording data of a different frame is included every image group in the reproduction data outputted finally. As compared with the related art, in the event of the variable speed reproduction, a dropout in the information is reduced and the information necessary for the reproduction at varied speed can be easily obtained.

The invention is not limited to the foregoing embodiment but can be variously modified. For example, although the case of changing the corresponding relation between the groups of the image data and the groups of the HDDs every frame has been described in the above embodiment, the corresponding relation may be changed every GOP.

Figure 18:
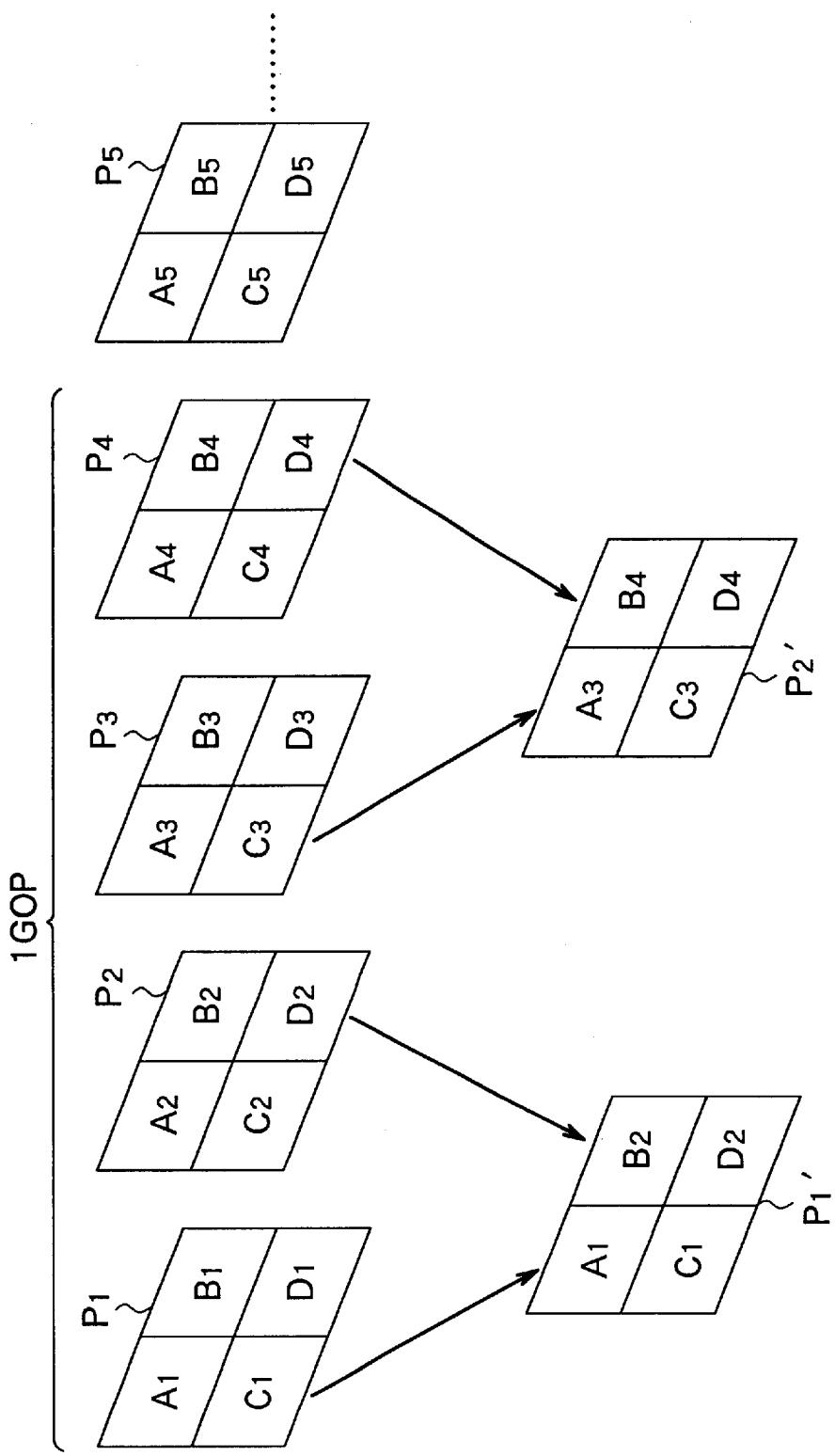
FIG. 18 is an explanatory diagram showing an example of a data recording and reproducing method when the correspondence relation between groups of image data and groups of the HDDs is changed on a GOP unit basis.
Figure 19:
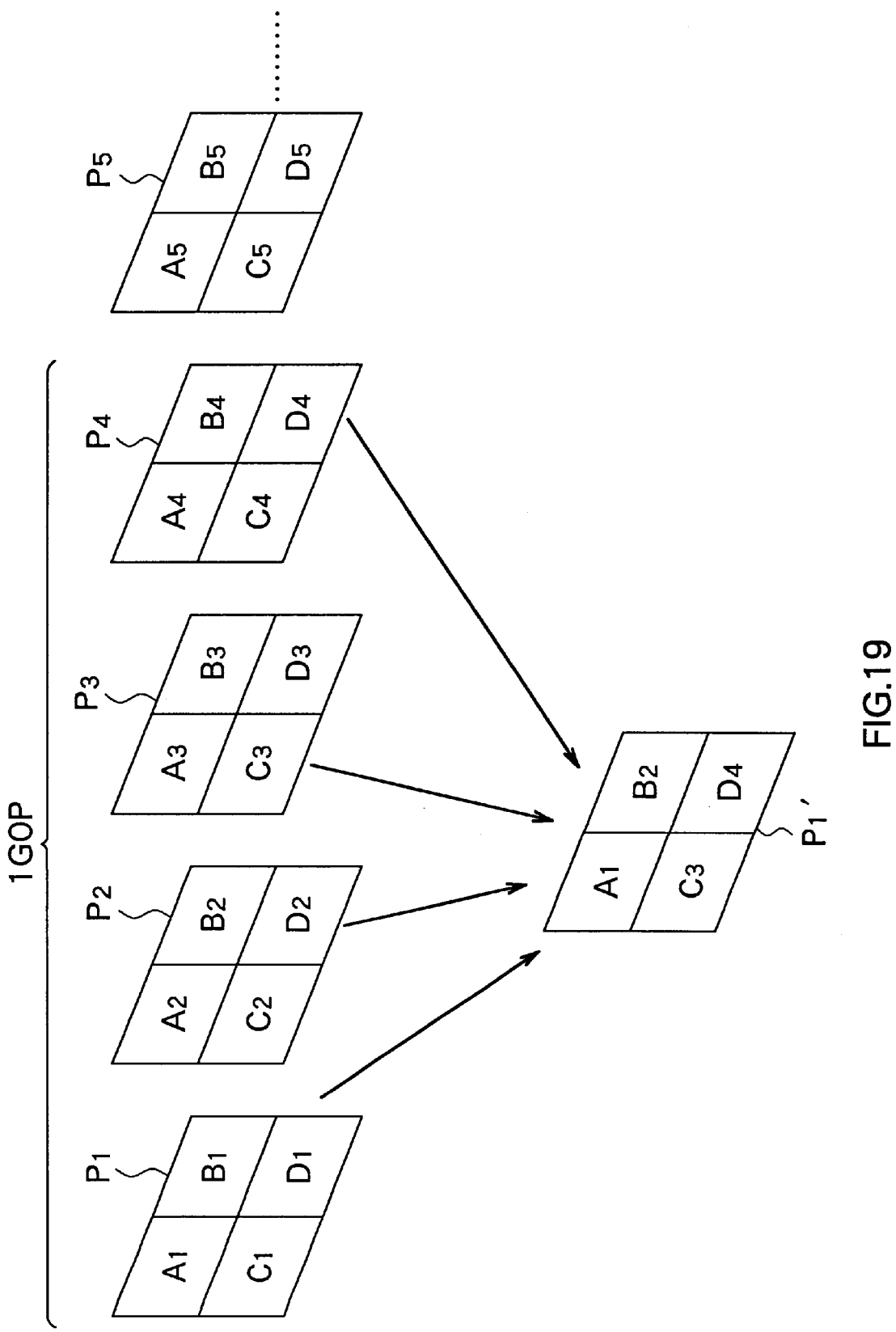
FIG. 19 is another explanatory diagram showing an example of a data recording and reproducing method when the correspondence relation between groups of image data and groups of the HDDs is changed on a GOP unit basis.

FIGS. 18 and 19 are explanatory diagrams showing an example of a data recording and reproducing method when the corresponding relation between the groups of the image data and the groups of the HDDs is changed every GOP. For example, in the case where image data of one GOP is formed by four frames ($P_1$ to $P_4$), each frame is divided into four parts. The divided parts of each frame are divided into four groups A ($A_1$ to $A_4$), B ($B_1$ to $B_4$), C ($C_1$ to $C_4$), and D ($D_1$ to $D_4$) on the GOP unit basis. The recording period of the image data which is divided into four groups on the GOP unit basis to the HDD 20 is changed. In the structure in which the data is grouped and recorded as mentioned above, when the reproduction operation at double speed is performed (FIG. 18), the AV server 10 forms a frame $P_1'$ by, for example, data $A_1$ and $C_1$ in the frame $P_1$ and data $B_2$ and $D_2$ in the frame $P_2$, forms a frame $P_2'$ by data $A_3$ and $C_3$ in the frame $P_3$ and data $B_4$ and $D_4$ in the frame $P_4$, thereby constructing reproduction image data. When the reproduction operation at quadruple speed is performed (FIG. 19), the AV server 10 forms one frame $P_1'$, for example, by the data $A_1$ in the frame $P_1$, the data $B_2$ in the frame $P_2$, the data $C_3$ in the frame $P_3$, and the data $D_4$ in the frame $P_4$, thereby constructing the reproduction image data.

Although the HDDs 20 are grouped in correspondence with the grouping of the image data of one frame in the foregoing embodiment, the HDDs 20 may be also grouped so that the image data is recorded into the HDDs 20 of different groups on the GOP unit basis.

FIGS. 20 and 21 are explanatory diagrams showing an example of a data recording and reproducing method in the case where the HDD 20 is grouped on the GOP unit basis. In FIGS. 20 and 21, each of G1, G2, G3, . . . shows image data of one GOP unit. Each of the image data in the GOP unit is constructed by a plurality of frames. In case of grouping the HDDs 20 on the GOP unit basis, as shown in FIG. 20, the image data in the GOP unit is sequentially recorded into the four groups W, X, Y, and Z of the HDDs 20. With respect to reproduction of the data recorded as mentioned above, for example, in case of performing the reproduction at double speed, by a single access operation, data G1 and G5 is read from the HDD 20W, data G10 and G14 is read from the HDD 20X, data G3 and G7 is read from the HDD 20Y, and data G12 and G16 is read from the HDD 20Z. The read data is finally outputted as data (G1, G3, G5, . . . ) having the structure shown in FIG. 21.

Further, although the case of dividing the image into four groups has been described above, the dividing number is not limited to four. For instance, the image may be divided into 8 or 16 groups.

Further, in the foregoing embodiment, as shown in FIG. 9, the information of the group ID is added to the substantial data area. The information of the group ID may be added to a free area or the like other than the substantial data area. In this case, the information of the group ID is added so as to correspond to the divided data in the data stream.

Although the input image data is divided on the byte unit basis in the foregoing embodiment, when the input image data is compressed image data, it is preferable to divide the image data on the basis of a compression macro block unit as the minimum unit in consideration of a process executed at the time of decompressing the compressed image data. Although the group ID is added in the foregoing embodiment, the group ID may not be added.

FIGS. 22 and 23 are explanatory diagrams for explaining the data structure of a compressed image. FIG. 22 shows a picture plane of one frame as an example. Each divided block in the picture plane shows a macro block element. In case of the compression image, usually, each macro block has individual address information (x, y). For example, the address of the macro block on the upper left part in the picture plane is (1, 1), the address of the divided block in the first row is ($x_i$, 1) (i is an integer of 1 or larger), and the address of the divided block in the first column is (1, $y_j$) (j is an integer of 1 or larger). FIG. 23 shows the structure of a data stream in the compressed image. The data stream in the compression image has, for example, a structure such that address information (X address and Y address) and information of a data length of the compressed data is included before the compression data as substantial data part of the compressed image. In case of the compressed image as mentioned above, since the image has individual address information (x, y) on the macro block unit basis, the data can be decompressed based on the address information at the time of reproduction without adding the group ID.

In addition, although the embodiment was described with a magnetic disk of HDD(Hard Disk Drive) as a recording medium, the invention is also applied to the case when a disk using magneto-optics or optics, such as MO(Magneto-Optic) disk or DVD(Digital Video Disk), or when semiconductor memory, such as DRAM(Dynamic Random Access Memory) or flash memory, is used as a recording medium.

As described above, according to the data recording and reproducing apparatus and the data recording and reproducing method of the invention, the divided data is recorded in groups into the recording media of different groups on the predetermined data unit basis while the relation between the groups of the divided data and the groups of the plurality of recording media which are grouped in correspondence with the number of groups of the divided data is periodically changed in a predetermined pattern. Thus, at the time of variable speed reproduction, the effects such that the information has few dropouts and information necessary for the variable speed reproduction can be easily obtained are produced.

Obviously many modifications and variations of the present invention are possible in the light of the above teachings. It is therefore to be understood that within the scope of the appended claims the invention may be practiced otherwise than as specifically described.

What is claimed is:

1. A data recording and reproducing apparatus comprising:

data dividing means for dividing input image data into a plurality of parts on a predetermined data unit basis, thereby generating divided data in a plurality of groups;

recording and reproducing means for recording said divided data onto a plurality of recording media, said recording media being divided into a plurality of recording media groups in accordance with the number of divided data groups and reproducing recorded divided data at multiple reproduction operation speeds;

image data forming means for forming desired image data on the basis of said divided data reproduced by said recording and reproducing means; and control means for controlling said recording and reproducing means so that said divided data of each of said divided data groups is recorded onto said recording media of said recording media groups respectively, while the relation between said divided data groups and said recording media groups is periodically changed in a predetermined pattern, on said predetermined data unit basis;

wherein data accessed by a single reproduction operation includes image data from different recorded frames recorded in at least two different of said plurality of recording media when said reproduction operation is performed at said multiple reproduction operation speeds and said image data from more than one frame is included in the reproduction data for each data to be reproduced.

2. The data recording and reproducing apparatus according to claim 1, wherein when a request of data reproduction at a varied speed is received, the control means allows the recording and reproducing means to continuously reproduce the divided data of different groups on the predetermined data unit basis only by a predetermined number from at least one group of recording media.

3. The data recording and reproducing apparatus according to claim 1, further comprising adding means for adding group information indicative of a group to which the divided data belongs to the divided data when recording of the divided data is performed.

4. The data recording and reproducing apparatus according to claim 3, wherein the divided data is transferred in a data stream having a predetermined data structure to the data recording and reproducing means and the adding means adds the group information to a predetermined area in the data structure of the data stream so as to correspond to the divided data in the data stream.

5. The data recording and reproducing apparatus according to claim 1, wherein the input image data is compressed image data and the data dividing means divides the image data on the basis of a compressed macro block unit as a minimum unit.

6. A data recording and reproducing method comprising the steps of:

dividing input image data into a plurality of parts on a predetermined data unit basis, thereby generating divided data in a plurality of groups;

recording said divided data onto a plurality of recording media, said recording media divided on a group unit basis so as to be recorded onto said recording media, in accordance with a number of groups of said recording media respectively, while periodically changing in a predetermined pattern the relation between groups of said divided data and groups of a plurality of said recording media grouped in accordance with a number of groups of said divided data;

wherein data accessed by a single reproduction operation includes image data from different frames recorded in at least two different of said plurality of recording media when said reproduction operation is performed at said multiple reproduction operation speeds and said image data from more than one frame is included in the reproduction data for each data to be reproduced; and reproducing recorded divided data with respect to said multiple reproduction operation speeds and forming desired image data on the basis of said divided data reproduced by said recording and reproducing means.

7. The data recording and reproducing method according to claim 6, further comprising the step of, when a request of data reproduction at a varied speed is received, continuously reproducing the divided data of different groups on the predetermined data unit basis only by a predetermined number from at least one group of recording media.

8. The data recording and reproducing method according to claim 6, further comprising the step of adding group information indicative of a group to which the divided data belongs to the divided data when recording of the divided data is performed.

9. The data recording and reproducing method according to claim 8, further comprising the steps of:

transferring the divided data in a data stream having a predetermined data structure; and adding the group information to a predetermined area in the data structure of the data stream so as to correspond to the divided data in the data stream.

10. The data recording and reproducing method according to claim 6, further comprising the step of receiving compressed image data as the input image data and dividing the compressed image data on the basis of a compressed macro block unit as a minimum unit.

\* \* \* \* \*